US012599795B2

(12) United States Patent
Pohl

(10) Patent No.: US 12,599,795 B2
(45) Date of Patent: Apr. 14, 2026

(54) VALVE STATION FOR A FIRE ALARM SYSTEM

(71) Applicant: MINIMAX GMBH, Bad Oldesloe (DE)

(72) Inventor: Matthias Pohl, Stubben (DE)

(73) Assignee: Minimax GmbH, Bad Oldesloe (DE)

( * ) Notice: Subject to any disclaimer, the term of this patent is extended or adjusted under 35 U.S.C. 154(b) by 248 days.

(21) Appl. No.: 17/825,079

(22) Filed: May 26, 2022

(65) Prior Publication Data

US 2022/0323807 A1 Oct. 13, 2022

Related U.S. Application Data

(63) Continuation of application No. 16/060,335, filed as application No. PCT/EP2016/079032 on Nov. 28, 2016, now Pat. No. 11,369,819.

(30) Foreign Application Priority Data

Dec. 29, 2015 (DE) ..................... 10 2015 226 776.8

(51) Int. Cl.
*A62C 35/68* (2006.01)
*A62C 37/36* (2006.01)
(Continued)

(52) U.S. Cl.
CPC .............. *A62C 37/36* (2013.01); *A62C 35/68* (2013.01); *A62C 37/44* (2013.01); *G08B 17/04* (2013.01)

(58) Field of Classification Search
CPC ......... A62C 37/36; A62C 35/68; A62C 37/44; A62C 35/605; G08B 17/04
See application file for complete search history.

(56) References Cited

U.S. PATENT DOCUMENTS 2,876,396 A 3/1959 Rush et al.
3,448,442 A 6/1969 Hube et al.
(Continued)

FOREIGN PATENT DOCUMENTS

AU 2011224120 A1 10/2011
CN 2260631 Y 8/1997
(Continued)

OTHER PUBLICATIONS

Office Action and Search Report with partial English translation, Chinese Application No. 201680076661.X, 13 pages (Feb. 3, 2020).
(Continued)

*Primary Examiner* — Tuongminh N Pham
(74) *Attorney, Agent, or Firm* — Perkins Coie LLP

(57) ABSTRACT

The invention relates to an alarm valve station for a fire alarm system, having an alarm valve with an extinguishing fluid inlet and an extinguishing fluid outlet, wherein the alarm valve is set up for selectively releasing or blocking the extinguishing fluid flow between the extinguishing fluid inlet and the extinguishing fluid outlet, having a pressure sensor which is in a fluid-communication with the alarm valve and which is configured to detect a change in pressure and for converting this into an electrical alarm signal, and having an alarm delay device for delaying the alarm signal. It is proposed according to the invention that the alarm delay device is designed as an electrical alarm delay device and is connected in signal-communication with the pressure sensor.

17 Claims, 5 Drawing Sheets

(51) Int. Cl.
*A62C 37/44* (2006.01)
*G08B 17/04* (2006.01)

(56) References Cited

U.S. PATENT DOCUMENTS

| | | | | |
|---|---|---|---|---|
| 3,958,643 | A | 5/1976 | Landsberg | |
| 4,539,557 | A * | 9/1985 | Redshaw | H04M 11/04 340/539.11 |
| 5,228,469 | A | 7/1993 | Otten et al. | |
| 5,297,635 | A | 3/1994 | McHugh | |
| 6,396,404 | B1 | 5/2002 | McHugh | |
| 6,578,602 | B1 | 6/2003 | Kirschner | |
| 8,459,369 | B2 * | 6/2013 | Eckholm | A62C 37/44 169/56 |
| 2001/0020901 | A1 | 9/2001 | McHugh | |
| 2005/0155777 | A1 * | 7/2005 | Reilly | F16K 1/2007 169/22 |
| 2006/0021760 | A1 | 2/2006 | Golinveaux | |
| 2008/0129497 | A1 | 6/2008 | Woodard | |
| 2014/0374125 | A1 | 12/2014 | Johnson | |

FOREIGN PATENT DOCUMENTS

| | | | |
|---|---|---|---|
| CN | 202302265 | U | 7/2012 |
| CN | 203595543 | U | 5/2014 |
| CN | 104436504 | A | 3/2015 |
| CN | 104455694 | A | 3/2015 |
| GB | 19150408 | | 9/1915 |
| JP | H08117357 | | 5/1996 |
| JP | H08161981 | | 6/1996 |
| JP | H08196658 | | 8/1996 |
| JP | 2003-102863 | A | 4/2003 |
| WO | WO 2006/014906 | A2 | 2/2006 |
| WO | WO2007/041284 | | 4/2007 |

OTHER PUBLICATIONS

Second Office Action (with English translation), Chinese Application No. 201680076661.X, 22 pages (Sep. 11, 2020.

International Searching Authority, International Search Report in German & English translation in International Appln. No. PCT/EP2016/079032, Mar. 2, 2017, 7 pages.

International Searching Authority, Written Opinion in German and English translation in International Appln. No. PCT/EP2016/079032, Mar. 2, 2017, 11 pages.

Canadian Patent Office, Office Action issued in Canadian Patent Application No. 3,007,221, Jun. 4, 2019, 4 pages.

* cited by examiner

VALVE STATION FOR A FIRE ALARM SYSTEM

PRIORITY CLAIM AND INCORPORATION BY REFERENCE

This application is a continuation application of Ser. No. 16/060,335, filed Jun. 7, 2018, which is a 35 U.S.C. § 371 application of International Application No. PCT/EP2016/079032, filed Nov. 28, 2016, which claims the benefit of German Application No. 10 2015 226 776.8, filed Dec. 29, 2015, each of which is incorporated by reference in its entirety.

TECHNICAL

The present invention relates to an alarm valve station for a fire alarm system, having an alarm valve, in particular a wet alarm valve, having an extinguishing fluid inlet and an extinguishing fluid outlet, wherein the alarm valve is configured to selectively release or block the extinguishing fluid flow between the extinguishing fluid inlet and the extinguishing fluid outlet, having a pressure sensor which is in fluid-communication with the alarm valve and which is configured to detecting a change in pressure and for converting this into an electrical alarm signal, and having an alarm delay device for delaying the alarm signal.

The invention also relates to a fire alarm system having such an alarm valve station, and to a fire-extinguishing system.

BACKGROUND ART

The extinguishing fluid inlet of the alarm valve of such alarm valve stations is normally connected in a fluid-conducting manner to an extinguishing fluid supply. The extinguishing fluid outlet of the alarm valve of such alarm valve stations is normally connected in a fluid-conducting manner to a sprinkler arrangement. The triggering of one or more of the connected sprinklers gives rise to an extinguishing fluid flow which is able to be (passively) released, and thus also detected, by means of the alarm valve if, as preferred, the alarm valve has one or more sensors for the state detection of, for example, the closing state of the valve, the pressure in the alarm channel (valve), etc.

The flow through the alarm valve results in a change in pressure within the alarm valve and in the fluid line connected in a fluid-conducting manner to the alarm valve and/or in a branching alarm line. In known alarm valve stations, said change in pressure is detected, and converted into an electrical alarm signal, by means of a pressure sensor which is connected in a fluid-conducting manner to the alarm valve.

However, a change in pressure can arise not only in the event of a sprinkler being triggered. In practice, it has been found that also the extinguishing fluid supply is subject to pressure variations, for example as a result of changing water supply pressures or pressure surges within a water supply network. Such pressure variations of the extinguishing fluid supply can accordingly lead to the generation of a brief water flow through the alarm valve and thus to the generation of an electrical (false) alarm signal by the pressure sensor.

In order to avoid such a false alarm, it has become common practice to connect hydraulic delay containers upstream of the pressure sensors. In the event of a rise in pressure, the hydraulic delay container is filled with extinguishing fluid first, before the pressure sensor is able to detect a change in pressure. Depending on the design of the hydraulic delay container, the filling process can take up to several minutes. In the event of pressure variations of the extinguishing fluid supply, the filling of the delay container is accordingly initiated first, before the pressure sensor is able to detect a change in pressure and convert this into an electrical alarm signal. However, the pressure variations of an extinguishing fluid supply generally last only a few seconds, with the result that only slight filling of the delay container occurs and the pressure sensor thus detects no change in pressure. Consequently, the generation of an electrical alarm signal does not occur, and so a false alarm is prevented by the hydraulic delay container.

The use of hydraulic delay containers entails several disadvantages, however. For example, the delay duration is thus predefined by the container size and the pressure conditions in the water supply and cannot be readily changed at a later stage without the delay container being replaced. Furthermore, the delay container is a safety-relevant hydraulic component, and this consequently entails high production and maintenance costs. In addition, a hydraulic delay container takes up a large amount of installation space of the alarm valve station, which limits the applicability especially in the case of confined spatial conditions.

Lastly, hydraulic delay containers require such an arrangement of the lines connected thereto that, following an actuation, the extinguishing fluid automatically flows out of the delay container, the pressure sensor and the alarm line again, and this limits the possibilities, in terms of construction, of the realization.

DISCLOSURE OF THE INVENTION

The object of the present invention is consequently to provide a solution by way of which the alarm delay is able to be realized in an easier and preferably space-saving way and with lower production and maintenance costs, and in which furthermore the delay time can preferably be matched better to the desired value.

The object on which the invention is based is achieved by an alarm valve station of the type mentioned in the introduction, wherein the alarm delay device is an electrical alarm delay device and is in a signal communication with the pressure sensor.

The invention makes use of the finding that, instead of a hydraulic alarm delay by means of a delay container connected upstream, the alarm delay can be achieved by an electrical alarm delay device which is connected downstream of the pressure sensor. The electrical delay device utilizes the conversion of the detected pressure variation into the electrical alarm signal, which conversion is carried out by the pressure sensor. An electrical delay device is able to be used universally since its properties, such as in particular the delay duration, do not depend on the structural design of the alarm delay device, as would be the case with a hydraulic delay container. Moreover, an alarm valve station with an electrical alarm delay device requires less effort in terms of production and maintenance.

The alarm valve of the alarm valve station according to the invention preferably has a closing body which is passively movable back and forth between a blocking position and a release position. The extinguishing fluid inlet of the alarm valve is preferably set up for being connected in a fluid-conducting manner to an extinguishing fluid supply. The extinguishing fluid outlet of the alarm valve is preferably set up for being connected in a fluid-conducting manner to a sprinkler arrangement. If the closing body is situated in the blocking position, the extinguishing fluid flow between the extinguishing fluid inlet and the extinguishing fluid outlet of the alarm valve is blocked. If the closing body is situated in the release position, the extinguishing fluid flow between the extinguishing fluid inlet and the extinguishing fluid outlet of the alarm valve is released. In wet alarm valves according to the invention, the closing body is passively opened if the pressure on the side of the fluid inlet chamber is greater than the pressure on the side of the fluid outlet chamber by a predetermined amount.

In a preferred embodiment, the alarm delay device is configured to delay the forwarding of a received electrical alarm signal by a delay duration. The delay of the forwarding of a received electrical alarm signal is preferably realized by the holding-back of the electrical alarm signal for the delay duration. In terms of signaling, it may be said that the alarm signal entering the alarm delay device is a primary signal, while the delayed signal exiting the alarm delay device is a secondary signal. Alternatively, the delay of the forwarding of the electrical alarm signal is realized in that the received primary electrical alarm signal is discarded and, after the delay duration has elapsed, a new secondary electrical alarm signal is generated. Preferably, the delay duration is settable. The settability of the delay duration allows the alarm valve station to be matched to the fire alarm system or the fire-extinguishing system, in which the alarm valve system is used.

The alarm valve station according to the invention is also advantageously refined in that the alarm delay device comprises a setting means which is operable to set the delay duration. The setting means is preferably designed for being manually actuated. In this way, service or maintenance personnel, for example, can manually set the delay duration of the alarm delay device on site at the alarm valve station. Alternatively or additionally, the setting means is designed for being actuated by setting signals.

In a further preferred embodiment of the alarm valve station according to the invention, the setting means comprises one or more analog or digital switches. Preferably, the setting means comprises one or more rocker switches, one or more rotary switches and/or one or more pushbuttons. Preferably, the setting means comprises a rotary regulator, a potentiometer and/or a jumper.

In a further preferred embodiment of the alarm valve station according to the invention, the alarm delay device comprises a communication module which is configured to do at least one of: receiving or transmitting data. Preferably, the communication module is connected in a signal-conducting manner to the setting means. The communication module is preferably designed for receiving setting parameters, such as for example the delay duration. The communication module is also preferably designed for communicating with at least one of: a remote control device, or a fire detection and/or extinguishing control panel.

Preferably, the communication module is configured to receive control signals. Furthermore, a communication module is preferred, which is designed for transmitting state information of the alarm delay device. In a further preferred embodiment of the alarm valve station according to the invention, the communication module has multiple communication interfaces. Simultaneous data exchange with multiple devices is able to be realized by means of the communication interface(s).

The alarm valve station according to the invention is also advantageously refined in that the communication module comprises a transmitter unit and a receiver unit and is preferably configured to bidirectionally exchanging data with a remote control device. The data exchange is preferably realized in a wireless manner. Alternatively or additionally, the data exchange is realized in a wired manner.

In a preferred embodiment of the alarm valve station according to the invention, the alarm delay device is configured to at least one of: permanently preventing the forwarding of the received electrical alarm signal, or discarding a received electrical alarm signal. The permanent prevention of the forwarding of a received electrical alarm signal is, within the context of the invention, also to be understood as being an unending delay of the forwarding of the alarm signal. The operating mode for the permanent prevention of the forwarding of a received electrical alarm signal and/or the discarding of a received electrical alarm signal is used in particular during the start-up or maintenance of an alarm valve station. In this way, it can be ensured that an alarm signal is not inadvertently forwarded during the start-up or the maintenance of the alarm valve station. In the case of known alarm valve stations which use a hydraulic delay container for delaying the forwarding of the alarm signal, the inadvertent forwarding of an alarm signal during the start-up or the maintenance of the alarm valve station is prevented by means of a shut-off member which blocks the fluid flow to the delay container or to the pressure sensor. An electrical alarm delay device which is set up for permanently preventing the forwarding of a received electrical alarm signal or discarding a received electrical alarm signal is therefore able to replace the function of the shut-off member with electrical signal processing, and so the shut-off member provided there is optional.

In a particularly preferred embodiment of the alarm valve station according to the invention, the alarm delay device is configured to cancel a persistent delay of the forwarding of an electrical alarm signal prior to the delay duration elapsing. In other words, the alarm delay device is preferably set up for discontinuing a delay process, which is already in progress, already prior to the end of the delay duration. In particular, the setting means has an actuating element, preferably in the form of a pushbutton, which is set up for prematurely canceling the persistent delay of the forwarding of an electrical alarm signal.

Preferably, the setting means has an actuating element, in particular in the form of a pushbutton, which is set up for manually initiating the delay of the forwarding of an electrical alarm signal. In particular, the setting means and/or the communication module are/is assembled in a control device of the alarm delay device.

In an advantageous refinement of the alarm valve station according to the invention, the pressure sensor and the alarm delay device are separate from one another and are preferably in signal-communication with one another. The pressure sensor and the alarm delay device are preferably each independent, structurally mutually separate components. Since the pressure sensor and the alarm delay device can be replaced independently of one another in the event of a defect, the maintenance effort (and thus the costs incurred) is thus considerably reduced in the event of a malfunction of the pressure sensor or the alarm delay device.

In a further embodiment of the alarm valve station according to the invention, the pressure sensor and the alarm delay device form a structural unit. The term “pressure sensor” is to be understood according to the invention as being a generic term, which also comprises for example “pressure switch”. In this way, owing to the smaller number of components, the construction and the start-up of the alarm valve station are considerably simplified. Furthermore, the risk of a malfunction is reduced since potential fault sources during the installation of the pressure sensor and the alarm delay device are avoided as a result of the design of the pressure sensor and the alarm delay device as a structural unit.

A further preferred embodiment of the alarm valve station according to the invention has an alarm line which is in fluid communication with the alarm valve, to the pressure sensor and to an emptying device, wherein the emptying device is set up for automatically emptying the alarm line, and if appropriate components connected thereto, if the alarm valve is situated in the blocking position.

The alarm line is preferably designed as an internal alarm channel and/or as an external conduit.

A further preferred embodiment provides a remote control device which is in signal-communication with the alarm delay device. Preferably, the remote control device is designed as a stationary or portable computer or mobile radio device. The remote control device preferably has a human-machine interface, such as for example a display, in particular a touchscreen, and/or one or more pushbuttons or keys.

The object on which the invention is based is further achieved by a fire alarm system having an alarm valve station according to one of the above-described embodiments, and a fire detection and/or extinguishing control panel. The fire detection and/or extinguishing control panel of the fire alarm system according to the invention is preferably in signal-communication with the (secondary side of the) alarm delay device. Regarding the advantages of the fire alarm system according to the invention, reference is made to the advantages of the alarm valve station according to the invention. Preferably, the fire detection and/or extinguishing control panel is configured to report a fire alarm to an external body. For example, the external body is security personnel, or a firefighting station such as for example the fire department.

The fire detection and/or extinguishing control panel is preferably configured to control an electrically operated alarm device, such as an alarm horn.

The fire detection and/or extinguishing control panel is preferably set up for controlling a mechanically operated alarm device, such as a water motor gong.

In a further preferred embodiment of the fire alarm system according to the invention, the communication module of the alarm valve station is configured to unidirectionally or bidirectionally exchange data with the fire detection and/or extinguishing control panel.

The fire alarm system according to the invention is also advantageously refined in that the fire detection and/or extinguishing control panel and the alarm delay device form a structural unit. In this way, the size of the alarm valve station is minimized. The integration of the alarm delay device into the fire detection and/or extinguishing control panel furthermore results in a reduction of the effort required for the start-up of the fire alarm system.

The fire alarm system according to the invention is advantageously refined in that the fire detection and/or extinguishing control panel is in signal-communication with the remote control device. As a result of the signal-conducting connection between the fire detection and/or extinguishing control panel and the remote control device or the alarm delay device, the degree of adjustability of the fire alarm system and thus also the operating comfort is further increased.

Preferably, a mechanically operated alarm device, such as for example a hydraulic alarm bell, is in fluid-communication with the alarm line.

The object on which the invention is based is further achieved by a fire extinguishing system having an alarm valve station according to one of the above-described embodiments, or having a fire alarm system according to one of the above-described embodiments, wherein the fire extinguishing system according to the invention also has an extinguishing fluid supply and a sprinkler arrangement.

The extinguishing fluid supply is in fluid-communication with the extinguishing fluid inlet of the alarm valve. The sprinkler arrangement is in fluid-communication with the extinguishing fluid outlet of the alarm valve.

BRIEF DESCRIPTION OF DRAWINGS

The invention will be described in more detail below with reference to the appended figures on the basis of preferred exemplary embodiments. In the figures.

MODE(S) FOR CARRYING OUT THE INVENTION

Figure 1:
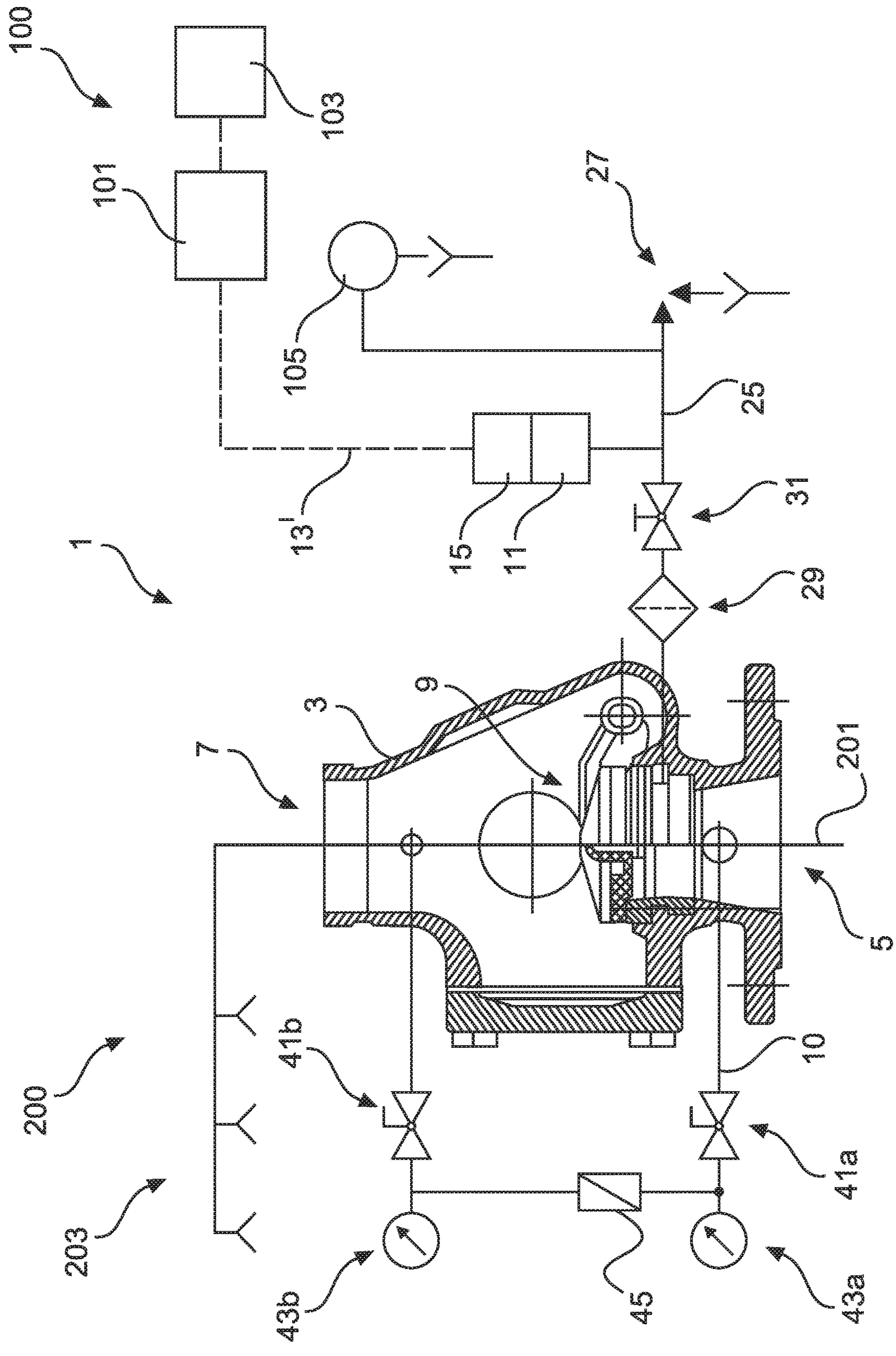
FIG. 1 shows an exemplary embodiment of a fire-extinguishing system according to the invention in a schematic illustration.

According to FIG. 1, the fire-extinguishing system 200 has a fire alarm system 100, an extinguishing fluid supply 201 and a sprinkler arrangement 203.

The fire alarm system 100 comprises an alarm valve station 1 and a fire detection and/or extinguishing control panel 101.

The alarm valve station 1 comprises an alarm valve 3 with an extinguishing fluid inlet 5 and an extinguishing fluid outlet 7, wherein the alarm valve 3 is set up for selectively releasing or blocking and, if appropriate, detecting the extinguishing fluid flow between the extinguishing fluid inlet and the extinguishing fluid outlet.

The alarm valve station 1 also comprises a pressure sensor which is connected in a fluid-conducting manner to the alarm valve 3 and which is set up for detecting a change in pressure and for converting this into an electrical, so-called primary alarm signal 13. Additionally, the alarm valve station 1 has an alarm delay device 15 for delaying the received primary alarm signal, with the result that said signal becomes a secondary alarm signal 13'. The alarm delay device 15 is connected on the input side in a signal-conducting manner to the pressure sensor 11 and is designed as an electrical alarm delay device 15.

The fire detection and/or extinguishing control panel 101 of the fire alarm system 100 is connected in a signal-conducting manner to the output of the delay device 15 of the alarm valve station 1 and an electrically operated alarm device 103.

Optionally provided is a remote control device 107 which is connected in a signal-conducting manner to the alarm delay device 15 and is set up for controlling the latter.

The extinguishing fluid supply 201 of the fire-extinguishing system 200 is connected in a fluid-conducting manner to the extinguishing fluid inlet 5 of the alarm valve 3. The sprinkler arrangement 203 of the fire-extinguishing system 200 is connected in a fluid-conducting manner to the extinguishing fluid outlet 7 of the alarm valve 3.

The alarm delay device 15 is set up for delaying the forwarding of a received electrical alarm signal 13 by a delay duration. The alarm delay device 15 is also set up for permanently preventing the forwarding of a received electrical alarm signal or discarding a received electrical alarm signal on the output side. Furthermore, the alarm delay device 15 is set up for prematurely canceling a persistent delay of the forwarding of an electrical alarm signal prior to the delay duration elapsing.

The alarm valve station 1 also comprises an alarm line 25, which is connected in a fluid-conducting manner to the alarm valve 3, to the pressure sensor 11 and to an emptying device 27, wherein the emptying device 27 is set up for automatically emptying the alarm line 25. A dirt trap 29 and a shut-off member 31 are also arranged in the alarm line 25. Moreover, the alarm line 25 is connected to a mechanically operated alarm device 105.

The alarm valve 3 has a closing body 9 which is movable back and forth between a blocking position and a release position. If no or only very little water flows through the alarm valve, the closing body 9 is situated in the blocking position. If, as a result of the triggering of a sprinkler, a pressure difference between the fluid inlet 5 and the fluid outlet 7 arises, the closing body 9 moves into the release position. The region of the alarm valve 3 which is connected upstream of the closing body 9 is connected in a fluid-conducting manner via a compensation line 10 to the region which is connected downstream of the closing body 9. The compensation line 10 comprises two shut-off valves 41*a*, 41*b*, two manometers 43*a*, 43*b* and a check valve 45. Consequently, it is possible for small quantities to flow between the fluid inlet 5 and the fluid outlet 7 without the closing body being moved into the release position.

The pressure sensor 11 and the alarm delay device 15 of the alarm valve station 1 are designed as a structural unit.

Figure 2:
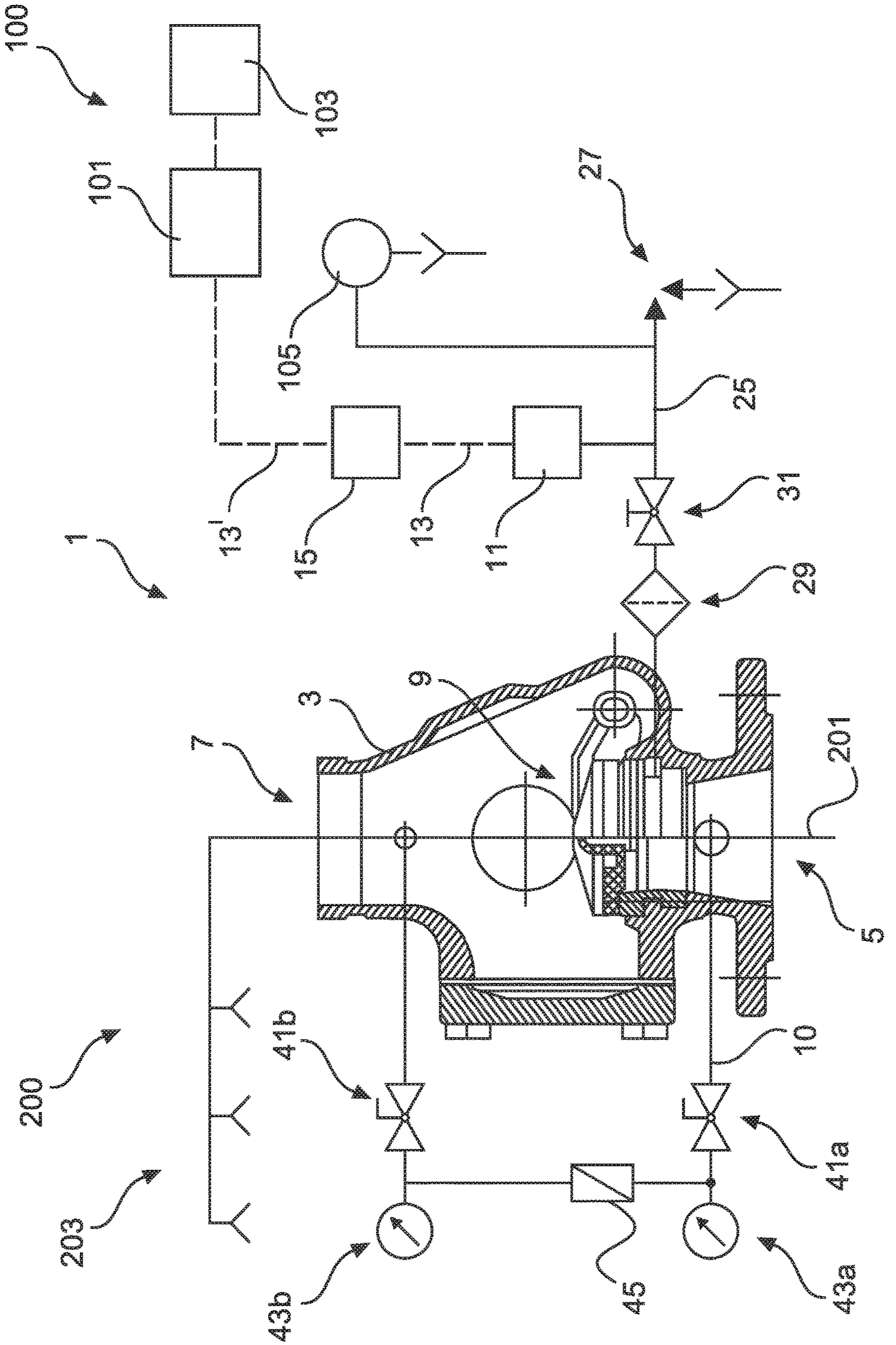
FIG. 2 shows a further exemplary embodiment of a fire-extinguishing system according to the invention in a schematic illustration.

According to FIG. 2, the pressure sensor 11 and the alarm delay device 15 of the alarm valve station 1 are designed not as a structural unit but separately from one another and are connected in a signal-conducting manner to one another. The pressure sensor 11 and the alarm delay device 15 are each independent, structurally mutually separate components. Otherwise, the construction of the fire extinguishing system 200 corresponds to that of the fire extinguishing system 200 from FIG. 1.

Figure 3:
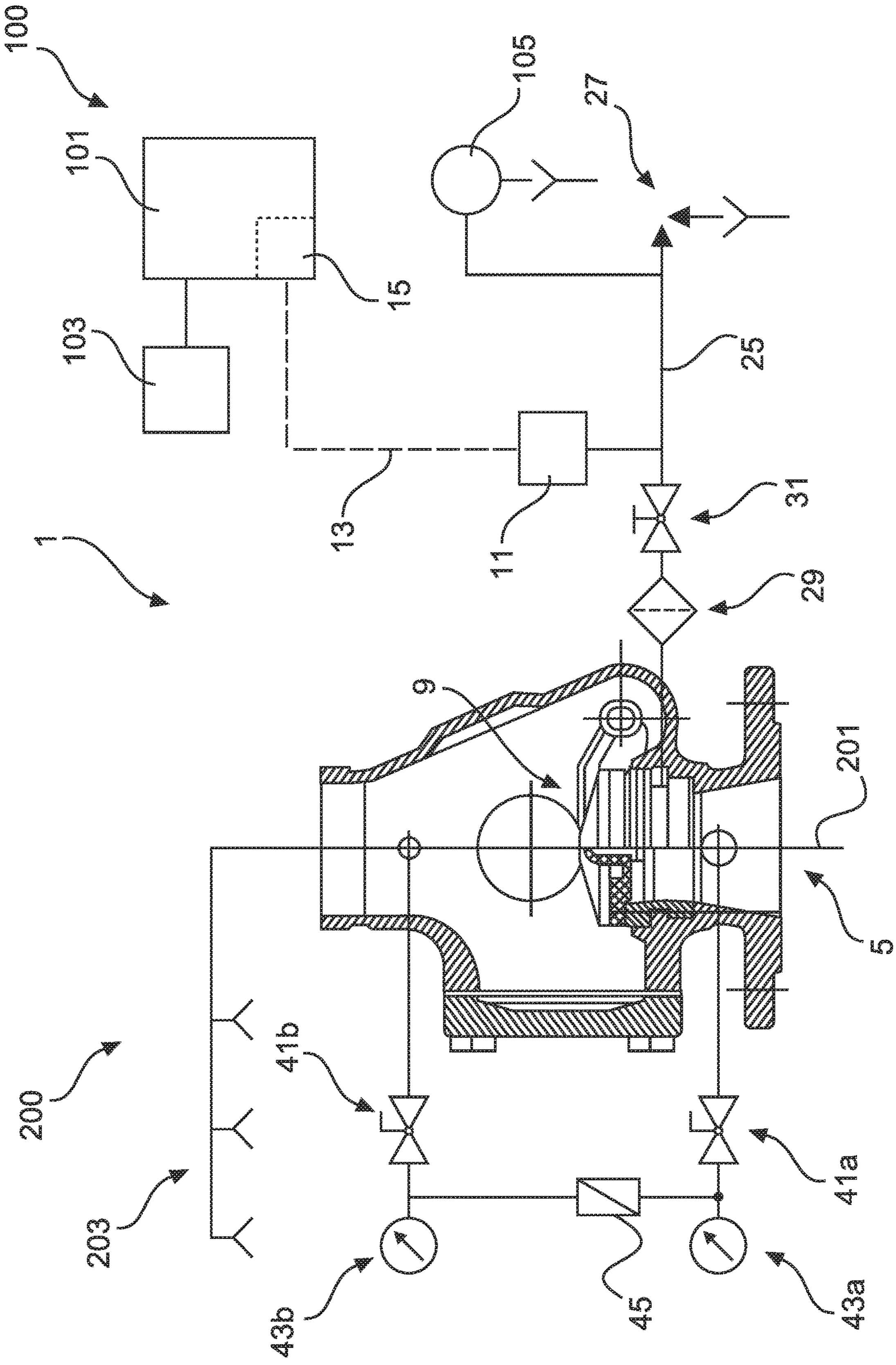
FIG. 3 shows a further exemplary embodiment of a fire-extinguishing system according to the invention in a schematic illustration.

According to FIG. 3, the fire detection and/or extinguishing control panel 101 and the alarm delay device 15 are designed as a structural unit. The pressure sensor 11 and the fire detection and/or extinguishing control panel 101 are connected in a signal-conducting manner to one another via the alarm delay device 15. The pressure sensor 11 and the alarm delay device 15 which, according to FIG. 3, is integrated in the fire detection and/or extinguishing control panel 101 are thus designed separately from one another and constitute structurally mutually separate components. Otherwise, the construction of the fire extinguishing system 200 corresponds to that of the fire extinguishing system 200 from FIG. 1.

Figure 4:
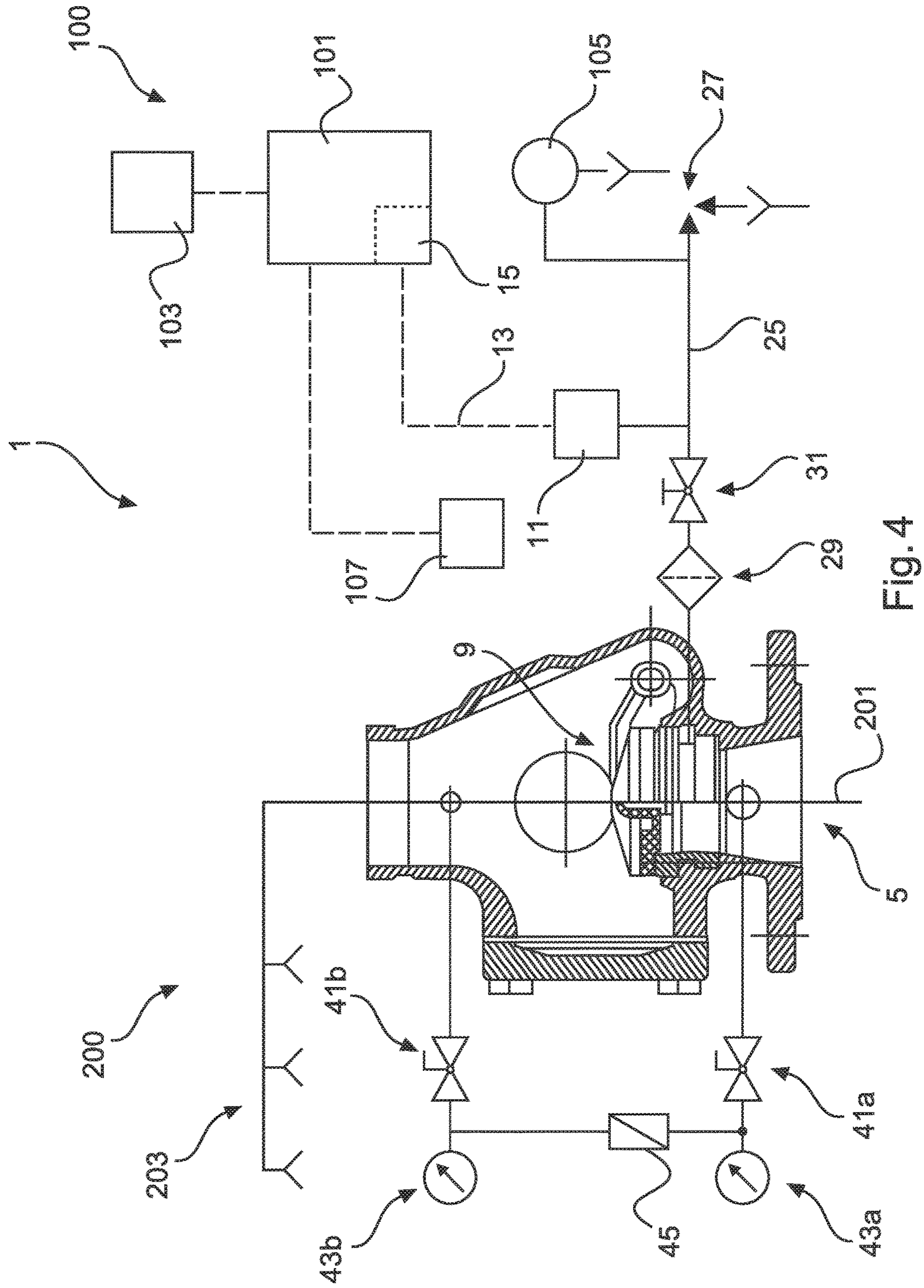
FIG. 4 shows a further exemplary embodiment of a fire-extinguishing system according to the invention in a schematic illustration.

According to FIG. 4, the fire detection and/or extinguishing control panel 101, in which the alarm delay device 15 is integrated, is connected in a signal-conducting manner to the remote control device 107, wherein the fire detection and/or extinguishing control panel 101 and the remote control device 107 are designed for bidirectionally exchanging data with one another. Otherwise, the construction of the fire extinguishing system 200 corresponds to that of the fire extinguishing system 200 from FIG. 3. Since the remote control device 107 is set up for electronically initiating a delay at the alarm delay device 15, which delay is selectively also permanent, it would be possible to dispense with the provided shut-off member.

Figure 5:
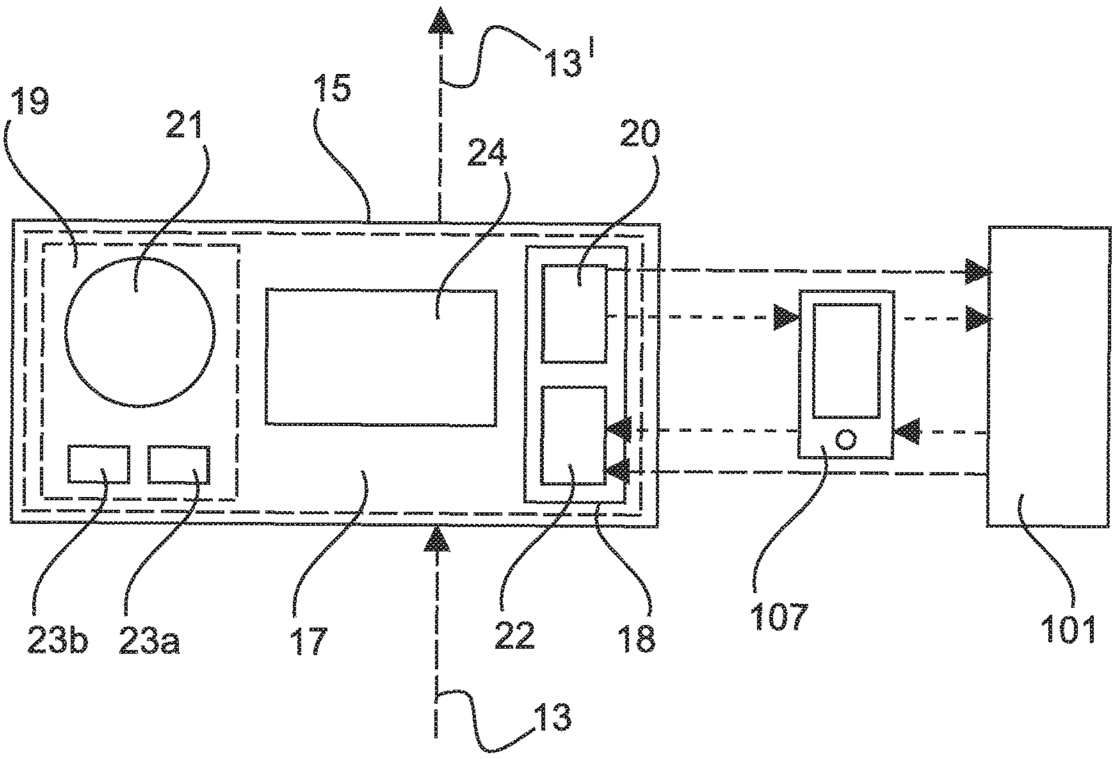
FIG. 5 shows an alarm delay device of an alarm valve station according to the invention.

According to FIG. 5, the alarm delay device 15 has multiple setting means 19 which are able to be actuated for the purpose of setting the delay duration. The setting means 19 comprise a rotary switch 21 which, with the use of a potentiometer, is designed as a rotary regulator. The setting means 19 also comprise further actuating elements, namely two pushbuttons 23*a*, 23*b*. The pushbuttons 23*a*, 23*b* are set up for prematurely canceling a persistent delay of the forwarding of an electrical alarm signal prior to the delay duration elapsing and for manually initiating a persistent delay of the forwarding of an electrical alarm signal. The setting means 19 are part of a control device 17 of the alarm delay device 15. The alarm delay device 15 also comprises a display 24 which is set up for visually representing setting parameters, such as the delay duration, and state information.

The alarm delay device 15 also comprises a communication module 18 which is designed for receiving and transmitting data. The communication module 18 comprises a transmitter unit 20 and a receiver unit 22 and is set up for bidirectionally exchanging data with the remote control device 107 and the fire detection and/or extinguishing control panel 101.

The remote control device 107 is designed as a portable mobile radio device and is set up for bidirectionally exchanging data with the alarm delay device 15 and the fire detection and/or extinguishing control panel 101.

REFERENCE SIGNS

1 Alarm valve station
3 Alarm valve
5 Extinguishing fluid inlet
7 Extinguishing fluid outlet
9 Closing body
10 Compensation line
11 Pressure sensor
13 Electrical (primary) alarm signal
13' Delayed electrical (secondary) alarm signal
15 Alarm delay device
17 Control device
18 Communication module
19 Setting means
20 Transmitter unit
21 Switch
22 Receiver unit
23*a*, 23*b* Pushbuttons
24 Display
25 Alarm line
27 Emptying device
29 Dirt trap
31 Shut-off member
41*a*, 41*b* Valves
43*a*, 43*b* Manometers 45 Check valve
100 Fire alarm system
101 Fire detection and/or extinguishing control panel
103 Electrically operated alarm device
105 Mechanically operated alarm device
107 Remote control device
200 Fire extinguishing system
201 Extinguishing fluid supply
203 Sprinkler arrangement

What is claimed is:

1. A valve station, comprising:

a valve having an extinguishing fluid inlet and an extinguishing fluid outlet, an internal sealing surface disposed between the extinguishing fluid inlet and extinguishing fluid outlet, an internal alarm channel disposed between the internal sealing surface and the extinguishing fluid inlet, and a block member that contacts the internal sealing surface to selectively release or block an extinguishing fluid flow between the extinguishing fluid inlet and the extinguishing fluid outlet, an alarm line without a shut-off member in fluid communication with the internal alarm channel, a mechanically operated alarm device in fluid communication with the alarm line without a shut-off member, a pressure sensor in fluid communication with the alarm line without a shut-off member, the pressure sensor configured to detect a change in pressure in the extinguishing fluid flow and to convert the change in pressure into an electrical alarm signal, an electrically operated alarm device in signal-communication with the pressure sensor configured to receive the electrical alarm signal, and an electrical alarm delay device configured to permanently prevent a forwarding of a received electrical alarm signal or discard a received electrical alarm signal.

2. The valve station as claimed in claim 1, wherein the electrical alarm delay device comprises a transmitter unit and/or a receiver unit configured to do at least one of: receiving or transmitting data.

3. The valve station as claimed in claim 2, wherein the transmitter unit is configured to bidirectionally exchange data with a remote control device.

4. The valve station as claimed in claim 1, wherein the pressure sensor and the electrical alarm delay device are separate from one another and are in signal communication with one another.

5. The valve station as claimed in claim 1, wherein the pressure sensor and the electrical alarm delay device form a structural unit.

6. The valve station as claimed in claim 1, comprising a remote control device which is in signal-communication with the electrical alarm delay device.

7. A fire alarm system comprising:

a valve station according to claim 1, and a fire detection and/or extinguishing control panel which is connected in signal-communication with the electrical alarm delay device and the electrically operated alarm device.

8. The fire alarm system as claimed in claim 7, wherein the fire detection and/or extinguishing control panel and the electrical alarm delay device form a structural unit.

9. The fire alarm system as claimed in claim 7, wherein the fire detection and/or extinguishing control panel is in signal-communication with a remote control device.

10. A fire-extinguishing system comprising:

a valve station according to claim 1, an extinguishing fluid supply in fluid-communication with the extinguishing fluid inlet of the valve, and a sprinkler arrangement in fluid-communication with the extinguishing fluid outlet of the valve.

11. A fire-extinguishing system comprising:

a fire alarm system according to claim 7, an extinguishing fluid supply in fluid-communication with the extinguishing fluid inlet of the valve, and a sprinkler arrangement in fluid-communication with the extinguishing fluid outlet of the valve.

12. A valve station, comprising:

a valve having an extinguishing fluid inlet and an extinguishing fluid outlet, an internal sealing surface disposed between the extinguishing fluid inlet and extinguishing fluid outlet, a block member that contacts the internal sealing surface to selectively release or block an extinguishing fluid flow between the extinguishing fluid inlet and the extinguishing fluid outlet, a pressure sensor and a mechanically operated alarm device in fluid communication with the valve and an alarm line without a shut-off member, wherein the pressure sensor is configured to detect a change in pressure in the extinguishing fluid flow and to convert the change in pressure into an electrical alarm signal, and an electrical alarm delay device in signal-communication with the pressure sensor configured to receive the electrical alarm signal, wherein the electrical alarm delay device is configured to delay a forwarding of a received electrical alarm signal by a delay duration, and wherein the delay duration comprises a delay time.

13. The valve station of claim 12, wherein the electrical alarm delay device is further configured to discard a received electrical alarm signal.

14. The valve station as claimed in claim 12, wherein the electrical alarm delay device comprises a switch operable to set the delay time.

15. The valve station as claimed in claim 12, wherein the electrical alarm delay device comprises a transmitter unit and/or a receiver unit configured to do at least one of: receiving or transmitting data.

16. A fire alarm system comprising:

a valve station according to claim 12, and a fire detection and/or extinguishing control panel connected in signal-communication with the electrical alarm delay device and an electrically operated alarm device.

17. A fire-extinguishing system comprising:

the fire alarm system of claim 16, an extinguishing fluid supply in fluid-communication with the extinguishing fluid inlet of the valve, and a sprinkler arrangement in fluid-communication with the extinguishing fluid outlet of the valve.

* * * * *